3,028,318
MANUFACTURE OF ZINC ORGANO COMPOUNDS
Paul Kobetz and Richard C. Pinkerton, Baton Rouge, La., assignors to Ethyl Corporation, New York, N.Y., a corporation of Delaware
No Drawing. Filed Feb. 1, 1960, Ser. No. 5,620
4 Claims. (Cl. 204—59)

This invention relates to the manufacture of organozinc compounds and more particularly to the manufacture of zinc dialkyl compounds, such as zinc diethyl.

Zinc dialkyl compounds are quite useful chemicals for various purposes. They exhibit well recognized value in organic syntheses generally, and, more particularly, in organic syntheses in which an ether solvent is to be avoided; and, more particularly, in the preparation of hydrocarbons having a quaternary carbon atom. In addition, zinc alkyls are useful as components of olefin polymerization catalysts.

Previous methods of making zinc alkyls have involved the reaction of zinc metal, or a zinc-copper alloy, with an alkyl iodide. This produces an alkyl zinc iodide, which in turn is decomposed to give the dialkyl zinc. This procedure is quite operable for preparations in which costs have no bearing. However, the method is basically uneconomic, because the relatively expensive alkyl iodides are necessary reactants, and, in addition, only one-half of the zinc metal is capable of being converted to the zinc alkyl. A need has thus existed for an efficient process for the manufacture of zinc organo compounds, especially the zinc dialkyls.

An object of this invention is to provide an improved process for the manufacture of zinc organo compounds and especially zinc diakyl compounds, such as zinc diethyl. Another object is to provide an electrolytic process capable of producing substantial quantities of zinc organo compounds in a relatively small electrolytic cell. Still another object is a process in which the zinc organo, or zinc dihydrocarbon products can be readily separated from the electrolyte and by-products by simple and economical techniques and in which the by-product can be regenerated and returned to the cell. Yet another object is to provide a new and novel process wherein zinc alkyl compounds can be synthesized, and wherein the identity of the alkyl groups appearing in the product is controllable within a single process or operation.

The foregoing and additional objects of the invention are provided by passing a current through a novel electrolyte and a zinc metal anode. The electrolyte comprises an alkali metal aluminum methyl compound and especially an alkali metal aluminum tetraalkyl in which at least one of the alkyl groups is a methyl group. An especially desirable electrolyte for carrying out the process of this invention comprises a mixture or complex of an alkali metal aluminum methyl compound with an alkali metal aluminum tetraalkyl or tetraaryl, the organo groups of the latter compound containing from 2 to about 12 carbon atoms.

More specifically, the process for manufacture of zinc dialkyl compounds in accordance with this invention comprises passing an electrolyzing current through a zinc anode and an electrolyte comprising an alkali metal aluminum tetraorgano compound having the formula:

$$MAl(CH_3)_xR_{4-x}$$

wherein M is an alkali metal, R is selected from the group consisting of alkyl and aryl groups, each group containing from 2 to 12 carbon atoms, and $x$ is an integer of from 1–4 inclusive. An especially preferred embodiment of this invention relates to the manufacture of zinc diethyl using a mixed complex having, in addition to the alkali metal aluminum methyl compound, another alkali metal aluminum compound in which all of the organo groups are ethyl groups. An especially preferred electrolyte contains more than one alkali metal, e.g. both sodium and potassium or sodium and lithium or all three metals.

The electrolyte mixture usually contains from 5–95 percent of the alkali metal aluminum methyl compound. Best results are obtained using a concentration of the alkali metal aluminum methyl compound of from 10–75 mole percent. A preferred concentration of the alkali metal aluminum methyl compound in the electrolyte mixture is from about 20–65 percent. In general, the electrolyte mixture should have a melting point below about 150° C. for manufacture of the zinc alkyl compounds and the most preferred electrolytes have melting points below about 100° C. The pure sodium aluminum tetramethyl, for example, has a melting point in excess of 240° C. but the addition of relatively small quantities of the sodium or potaassium aluminum tetraethyl, or higher organo compounds, sharply reduces the melting point of the mixture.

The above process involves exceptionally simple techniques and apparatus and provides exceedingly high yields of the zinc dialkyl, in essence, directly from zinc, hydrogen, and olefin. The zinc metal is converted at the anode to zinc dialkyl and the electrolyte, in the manufacture of zinc dialkyl compounds, can be regenerated, either periodically or continuously, by reaction with an olefin and hydrogen. The process is capable of extremely high production capacities because it can be operated at high current densities, and this is practical because of the very high conductivity of the complex electrolyte. The process can be conducted at these high current densities at temperatures well below the boiling point temperatures of the zinc organo compounds, in most cases. On the other hand, for numerous of the zinc dialkyl compounds, the process can be conducted at temperatures above the boiling points of the zinc dialkyl product. In such embodiments, the zinc dialkyl can be withdrawn directly from the cell as a vapor product, thus achieving a purification concurrently with the manufacture thereof.

A further benefit realized from the electrolytes employed is that the control of the thermal balance of the cell is facilitated. In other words, with a highly conductive electrode available, it is a very simple matter to provide for heat input, accompanying the current flow, without necessitating heat input from some thermal source.

A particular feature and surprising result of the present invention is that practically no methyl groups appear in the zinc alkyl product even when the electrolyte components contain a substantial proportion of such substituents of the total alkyl substituents present. Instead, the methyl groups are recovered as aluminum containing compounds, in certain instances, and in other cases, remain unchanged and retained in the electrolyte as components thereof.

Aluminum trialkyls, thus, are by-products, or coproducts of the present invention, and, in numerous instances, have higher boiling points than the zinc organo products. The alkali metal aluminum methyl-containing compound of the electrolyte are to provide high conductivity to the electrolyte system. At the same time the readily separable aluminum trialkyl joint products are readily regenerated and returned to the electrolyte to replenish the available supply of alkyl groups for electrolytic deposition or attachment to the zinc metal.

As will be seen from the following discussion, through regeneration of the alkali metal aluminum alkyl, the basic raw materials necessary for this process are metallic zinc, olefin and hydrogen. When carrying out the process the aluminum trialkyl compound is formed in varying proportions dependent upon the specific alkyl groups present on the zinc and aluminum compounds. Typical proportions of the aluminum trialkyls are from 25 to 75 percent by weight of the total anode products. The aluminum compounds can be recovered or converted back to the alkali metal-containing compound for reuse in the process.

The reaction of the present process can be illustrated, using the mixed electrolyte, as follows:

$$2MAlR_4 + Zn \xrightarrow{MAlMe_4} 2M + 2AlR_3 + ZnR_2$$

wherein M, Me, and R are as defined above. The aluminum trialkyl formed in the process, as already indicated, is frequently removable from the electrolysis zone as a relatively pure component, especially in those instances when the principal product, zinc dialkyl, is discharged or removed in the vapor phase. In other instances, the aluminum trialkyl and the zinc organo product are released as a mixed liquid product. In such instances, these components are readily separated by a relatively simple distillation.

One method of regenerating the electrolyte component and of recycling the aluminum trialkyl is in accordance with the equation:

$$AlR_3 + MBR_4 \to MAlR_4 + BR_3$$

or $$AlR_2Me + MBR_4 \to MAlR_3Me + BR_3$$

These operations regenerate the aluminum complex which can be returned to the electrolysis zone. The resultant boron compound can be regenerated by the following equations:

$$BR_3 + MH \to MBR_3H$$

$$MBR_3H + olefin \to MBR_4$$

As discussed above, it is convenient to carry out the electrolysis of this invention using an electrolyte containing both an alkali metal aluminum tetramethyl and an alkali metal aluminum tetraalkyl in which the alkyl contains at least 2 carbon atoms. It is to be recognized that the electrolyte can contain two or more methyl-containing compounds, such as sodium aluminum methyl triethyl, sodium aluminum dimethyl diethyl and sodium aluminum trimethylethyl, and especially mixed compounds of two or more alkali metals.

The present process can be carried out over an exceedingly wide temperature range, generally from 0 to about 200° C. The upper temperature at the anode is occasionally limited by some decomposition of the zinc dialkyl product. Further, in those embodiments of the process wherein mixed alkyl groups appear on the zinc dialkyl product, it is found that disproportionation is more apt to occur, that is, the mixed alkyl zinc product will be converted to a mixture of two zinc dialkyls. A preferred range of operating temperatures is, then, from about 70° C. to about 150° C. When the alkali metal of the electrolyte is solely sodium, the operating temperature, at least in the cathode zone, should be above 100° C., to assure that the sodium metal released is withdrawable in the liquid phase. Frequently, however, potassium is provided as a portion of the alkali metal constituent and in such cases, the metal released at the cathode is a liquid at almost room temperatures.

In some cases it is desirable to use a solvent for the zinc alkyl compound directly in the electrolysis cell. Such liquids are, preferably, non-miscible with the electrolyte. Typical examples of suitable extractants are certain thermally stable aliphatic and aromatic hydrocarbons. Excellent results are obtained with such extractants as kerosene and mineral oil provided in proportions of from about 25 to 75 percent of the zinc alkyl compound.

Normally, the electrolysis is conducted at or near atmospheric pressure. However, a pressure of hydrogen or inert gas such as nitrogen can be employed when desired, especially to assure an oxygen and moisture-free system. In some cases, it is desirable to employ a reduced pressure to effect distillation of the zinc alkyl compound and/or the aluminum compound from the cell during the electrolysis.

The following are typical examples of the process of this invention, all parts being given in parts by weight.

Example I

A closed cell was provided with an annular copper cathode and an axially positioned zinc anode. To this cell was added an electrolyte containing equimolar proportions of sodium aluminum tetramethyl and sodium aluminum tetraethyl. The cell was heated to a temperature of approximately 105° C. and a 2.2 volt potential was applied across the electrodes. The current density in amperes/sq. cm. was 0.35. The anode efficiency was approximately 80 percent. During operation, the cell was subjected to a vacuum, producing a pressure of only 415 mm. mercury above the electrolyte. Zinc alkyls were withdrawn as vapor through a conduit by which vacuum was applied, and was recovered by condensing in a refrigerated trap. The zinc alkyls were predominantly all zinc diethyl, with only minor quantities of methyl groups present, despite the fact that 50 percent or more of the alkyl groups in the electrolyte are methyl groups. Concurrently with the formation of the zinc diethyl, aluminum trialkyls were released at the anode and are collectible as a separate liquid. In addition, liquid sodium is formed at the cathode and is also withdrawable as such. The methyl and ethyl aluminum by-products, with minor quantities of electrolyte, are then reacted with sodium boron tetraethyl at a temperature of about 100° C. to produce the corresponding sodium aluminum alkyl and the corresponding alkyl boron compound. The latter is a gas at reaction temperature and can be readily separated from the complex aluminum compound. The aluminum complex is thereafter recycled to the electrolytic cell.

Example II

Example I was repeated except that 25 mole percent of potassium metal was added to the electrolyte to displace the corresponding amount of sodium metal. In this electrolysis the current density in amperes/sq. cm. is increased and the anode efficiency is slightly greater.

Example III

Example I was repeated except that the electrolyte consisted of 3 moles of sodium aluminum tetraethyl and 1 mole of sodium aluminum tetramethyl. Comparable results are achieved.

Example IV

Example III was repeated except that 10 mole percent potassium was added to displace a corresponding quantity of sodium, providing an electrolyte containing both sodium and potassium.

The following tabulated examples are carried out in a similar fashion to that of Example I. The product in each instance is a zinc dialkyl having 2 or more carbon atoms in each alkyl group, with the exception of Example VIII which forms zinc dimethyl. In each instance excellent conductivity is obtained and a good yield of the zinc dialkyl is provided.

| Example No. | MAlMe₄ | MAlR₄ | MAlMe₄/ MAlR₄ Mole Ratio | Temp., °C. | Product | Mode of Withdrawal of Zinc Alkyl |
|---|---|---|---|---|---|---|
| V | KAlMe₄ | KAlnPr₄ | 8 | 180 | Zinc dipropyl-zinc dimethyl mixture. | Vapor phase. |
| VI | NaAlMe₄ | NaAl(C₆H₅)₄ | 0.1 | 190 | Zinc diphenyl | In solution with aluminum triphenyl. |
| VII | LiAlMe₄ | NaAl(C₁₀H₂₁)₄ | 0.3 | 40 | Zinc didecyl | Liquid phase. |
| VIII | RbAlMe₄ | NaAl(CH₃)₄ | 5 | 100 | Zinc dimethyl | Vapor phase. |
| IX | NaAlMe₄ | CsAlEt₄ | 2 | 80 | Zinc diethyl, small amounts zinc dimethyl. | Do. |

NOTE: n-pr=normal propyl. C₆H₅=phenyl.

Example X

Example I is repeated except that the electrolyte consists of sodium aluminum tetramethyl, potassium aluminum tetraethyl, and lithium aluminum tetraethyl in equimolecular proportions. In addition, mineral oil (equal in proportion to about 80 percent of the zinc diethyl generated) is provided as an extractant to absorb the zinc diethyl for removal in the liquid phase, along with aluminum alkyls jointly released.

The alkali metal aluminum methyl compounds can be prepared in one of several ways. A convenient process involves the displacement reaction of the elemental alkali metal with aluminum trimethyl forming the corresponding alkali metal tetramethyl. These compounds can also be prepared by the addition reaction of aluminum trimethyl and alkali metal alkyl compounds, or contrary-wise, aluminum trialkyls with sodium methyl. A particularly suitable method for the mixed alkyl compounds is the reaction of an olefin, e.g. ethylene with an alkali metal aluminum alkyl hydride. Likewise, the complex methyl compound can be made by reaction of an alkyl halide with an alkali metal and trimethyl aluminum.

The alkali metal aluminum tetraorgano compound (the organo group containing 2 or more carbon atoms) can be made by analogous processes. That is, the alkali metal can be reacted directly with the aluminum triorgano compound, e.g. sodium reacts with triethyl aluminum to form sodium aluminum tetraethyl and metallic aluminum. Likewise, sodium ethyl and other alkali metal organo compounds will react directly with the aluminum triorgano compound to form the complex as an addition product. The corresponding organo halides will also react with the alkali metal and aluminum triorgano compound to form the complex, for example, sodium reacts with ethyl chloride and aluminum triethyl to form sodium aluminum tetraethyl. A particularly desirable method of preparing the alkyl complexes is the process discussed above with reference to regeneration of the trialkyl aluminum electrolyte. Trialkyl aluminums, e.g. trimethyl aluminum or triethyl aluminum, will react with an alkali metal hydride such as sodium hydride to form the corresponding complex hydride, e.g. sodium aluminum triethyl hydride, which can thereafter be reacted with a suitable olefin, as discussed above, forming sodium aluminum tetraethyl. All of the above preparation reactions can be carried out at temperatures from about 0° C. to about 150° C.

Normally, solvents are not employed in the electrolysis system of this invention since they tend to reduce the conductivity of the electrolyte. However, when they are desired for certain purposes, such as to provide a more fluid medium, it is best to employ hydrocarbons, especially aromatic hydrocarbons which are unreactive with the reactants, products and electrolyte. Particularly suitable solvents are toluene, the xylenes and other substituted benzene and naphthalene compounds. In some cases the ethers can be used, especially the glycol ethers, such as ethylene glycol dialkyl ethers, diethylene glycol dialkyl ethers and triethylene glycol dialkyl ethers, wherein the alkyl group contains from 1–6 carbon atoms.

The particular design of the cell employed for the process is not a highly critical factor. In general, it is desirable to provide the zinc anode in a form having a relatively high surface relative to the mass, so that rectangular rods, of relatively thin cross-section, are frequently employed. In certain types of apparatus, provision can be made to continuously feed fresh anode material as preceding anodes are consumed. In most cases, however, it is found preferable to withdraw an anode after partial consumption and replace with a fresh anode of uniform configuration. Operating cells are also frequently fitted with a foraminous diaphragm, such as a glass-fibre screen cloth or a non-corrosive metal mesh. Such a diaphragm assists in maintaining separation of the anode products and the alkali metal cathode product, especially where mechanical agitation is also supplied to the electrolyte bath.

Having described the invention fully, what is claimed is:

1. A process for the manufacture of diethylzinc product which comprises passing an electric current through a zinc anode and an electrolyte consisting essentially of an equimolar mixture of sodium aluminum tetramethyl and sodium aluminum tetraethyl at about 105° C. and a current density of about 0.35 ampere per square centimeter.

2. A process for the manufacture of dihydrocarbon zinc compounds, the hydrocarbon radicals thereof predominating in radicals having at least 2 carbon atoms, comprising passing an electric current through an electrolyte and a zinc anode, said electrolyte consisting essentially of alkali metal aluminum tetrahydrocarbon, the hydrocarbon radicals in said electrolyte including from 5 to 95 percent methyl groups.

3. A process for the manufacture of dialkyl zinc compounds comprising forming an electrolyte from alkali metal aluminum tetramethyl and alkali metal aluminum tetraethyl, the alkali metal tetramethyl being in proportions from 5 to 95 mole percent, and charging to an electrolytic zone and electrolyzing by passing an electric current therethrough and through a zinc anode in contact therewith and forming thereby dialkyl zinc, wherein the alkyl groups thereof predominate in non-methyl groups, and removing said dialkyl zinc from the electrolysis zone.

4. The process of claim 3 wherein the alkali metals of the electrolyte compounds are different.

References Cited in the file of this patent

UNITED STATES PATENTS 2,849,349     Ziegler et al.     Aug. 26, 1958

FOREIGN PATENTS 214,834     Australia     Apr. 24, 1958